Oct. 11, 1938.   J. W. FOOTE   2,132,727
VERTICAL DUST APPLICATOR
Filed Oct. 14, 1933
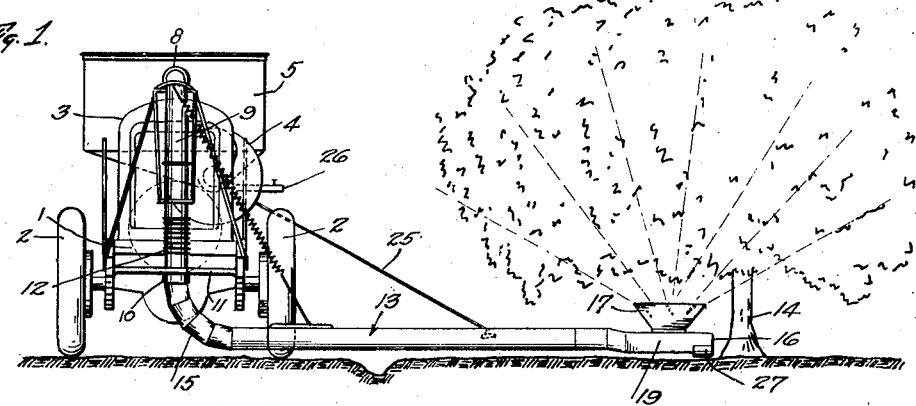
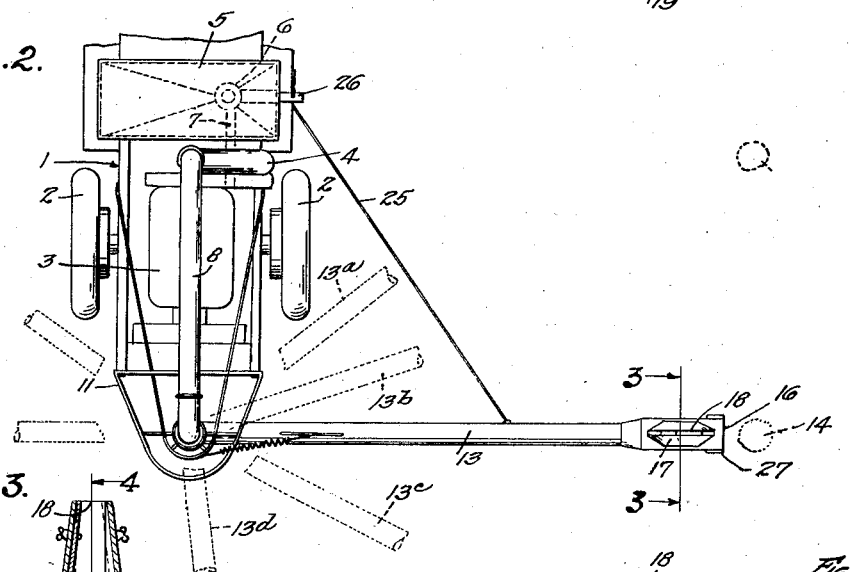
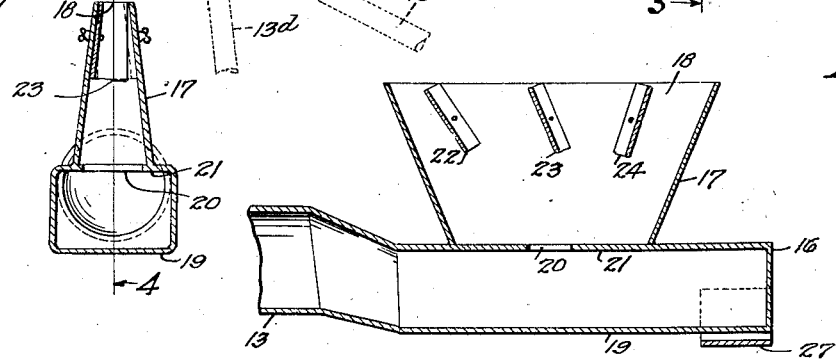
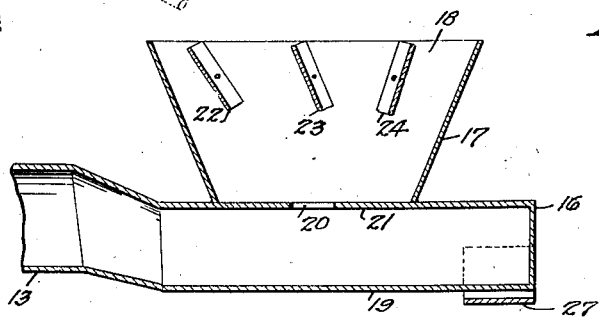
INVENTOR
James W Foote
ATTORNEY.

Patented Oct. 11, 1938

2,132,727

UNITED STATES PATENT OFFICE 2,132,727

VERTICAL DUST APPLICATOR

James W. Foote, Highland, Calif., assignor, by mesne assignments, to Pestco Laboratories, Inc., a corporation of California Application October 14, 1933, Serial No. 693,641

7 Claims. (Cl. 43—148)

My invention relates to dust applicators and more particularly to apparatus adapted for dusting or "dry spraying" fruit trees or vines with insecticide or fungicide in the form of dry dusts.

It is well known that citrus, walnut, avocado and other fruit-bearing trees are subject to infestation by insect pests, such as the "black" and citricola scales which cause injury to trees by extracting the plant juices and by the excretion of honeydew in which grows the sooty-mold fungus, the latter interfering with the plant function and disfiguring the fruit; the red, yellow and purple scales which cause injury by extracting the plant juice from both foliage and fruit, by disfiguring the latter, and by excretions toxic to the plant; the citrus thrips which cause injury by scarring and deforming the young foliage and fruit; the citrus, avocado and common red spider or mites; the citrus and walnut aphids, all of which feed upon the plants by extracting the juices, and when allowed to increase under favorable weather conditions may cause defoliation of said trees.

These insect pests produce young in large numbers which attach themselves to both the top and the underside of the leaves and twigs, many of these, such as the scale insects thriving best upon the inside surface of the foliage or in any other position away from the direct rays of the sun. Thus on heavily foliaged trees, such as the citrus trees, it is difficult to successfully treat the trees for these pests by the ordinary spray methods since the effective application of the spray is only upon the exterior surface of the leaves and the spray is substantially stopped by the outer leaves from penetrating to the interior portions of the tree. Fumigation methods have been attempted to overcome these pests and to overcome the deficiency of the sprays, requiring, however, that each tree be covered by a tent beneath which the fumigating gas, such as HCN gas, is introduced. The fumigation methods are, therefore, extremely slow and are expensive to apply, since it is necessary to place a tent over each individual tree, gas each individual tree, and then remove the tents. Moreover, the fumigation methods have been found wanting as a positive control of the pests due to the fact that at any season at which fumigation occurs there will be numbers of the insect eggs which have not hatched and which are therefore impervious to the action of the gas, while others of the insects have so matured that they are resistant to the effects of such concentration of gases as are permissible without causing burning of the fruit and foliage. After a few seasons' application of the gas to an orchard, a gas-resistant brood of insects is developed and further fumigation is of little or no value in the control of these pests.

However, substantially all of the pests enumerated may be killed off if contacted with finely divided sulphur during the period of life immediately succeeding the hatching, the newly hatched insects being covered with a viscous liquid to which the finely divided sulphur will adhere and which will destroy the insects in the larva stage.

The application of the finely divided sulphur dust has been attempted, and found to be extremely successful except for the disadvantages, first, that it is difficult to obtain a thorough distribution of the sulphur dust throughout the foliage and fruit of a tree without applying an excess of dust to certain parts of the tree and applying little or no dust to other parts of the tree; and, second, when the dust is applied from the outside of the tree, considerable quantities of the dust accumulate upon parts of the tree, foliage and fruit which are subjected to the direct rays of the sun and "sulphur burns" injuring the foliage and fruit will occur.

It is therefore an object of my invention to provide an apparatus which will apply sulphur and similar dusts to trees from the interior of the tree as distinguished from applying the dust from the exterior of the tree, as has hereinbefore been the practice, thus insuring the distribution of the sulphur primarily to the inner or underneath sides of the foliage, twigs and fruit.

Another object of the invention is to provide an apparatus for applying sulphur and similar dusts to trees in which the dust is ejected into the air at a point below the tree and directed upwardly into the interior of the tree.

Another object of the invention is to provide an apparatus for applying sulphur and similar dusts, in which a portable blower and dust mixer is provided with an elongated conduit arranged to extend horizontally parallel with the ground to points beneath the trees, and having a nozzle which will direct the dust in the shape of a sector of a circle, lying in a substantially vertical plane.

Another object of the invention is to provide a dust applicator as defined in the preceding paragraph, in which the plane of the sector shape of the ejected dust lies parallel to the longitudinal axis of the conduit reaching beneath the tree.

Other objects of my invention will be apparent from a study of the following specification:—

Reference is had to the accompanying drawing, in which the similar reference characters denote the similar parts.

In the drawing:

Fig. 1 is an end elevational view of the apparatus, used for dusting the trees, showing my novel form of the dust distributor.

Fig. 2 is a top view of the apparatus, showing the distributor with the nozzle, adapted to be directed into various positions.

Fig. 3 shows a transverse cross-sectional view of the nozzle taken on the line 3—3, of the Fig. 2.

Fig. 4 shows a longitudinal cross-sectional view of the nozzle, disclosing the baffle plates, taken on the line 4—4, of the Fig. 3.

Referring to the drawing, I have illustrated the preferred embodiment of my dust applicator as including a suitable carriage 1 supported upon wheels 2 by which the carriage may be moved through an orchard or grove, the carriage being either drawn through the grove by means of any desired draft animals or apparatus, or the carriage may constitute an ordinary automobile truck having its own driving engine. The carriage constitutes a support for a suitable motor 3 which may be the driving motor for the carriage or may be a separate motor preferably of the internal combustion type arranged to drive a blower 4. Mounted on the carriage 1 is a hopper 5 in which sulphur or similar insecticide or fungicide dust may be placed, the dust from the hopper 5 being introduced into the blower 4 or into the air current produced by the blower 4 through a suitable control and regulating valve 6 permitting varying quantities of the dust to be passed through a passage 7 into the air current produced by the blower 4. From the blower 4 I provide a pipe 8 preferably extending to the rear of the carriage 1, the pipe 8 being preferably formed with a vertically extending section 9 directed toward the ground, the lower end of the vertical section 9 terminating in a flexible or universal joint coupling 10 resiliently supported upon a framework 11 extending from the rear of the carriage. If desired the lower portion of the section 9 may be formed of flexible tubing, as indicated at 12, in order to lend greater flexibility to the apparatus. A dust applicator conduit 13 is arranged to conduct the blast of dust and air from the pipe 8 to a point located sufficiently remote from the carriage 1 as to permit the exit end of the conduit 8 to lie below the tree 14 when the carriage is located in the aisle or space between the adjacent rows of trees. The conduit 13 is provided at one of its ends with an elbow 15 connected to the coupling 10 in such manner as will permit the conduit 13 to be swung horizontally through a relatively large arc and also permit the outer end of the conduit 13 to be slightly raised and lowered to avoid low obstructions which may be upon the ground over which the carriage 1 is moved.

The exit end of the conduit 13 is provided with a baffle mechanism 16 which will change the direction of movement of the dust and air passing through the conduit from the horizontal to the vertical and also the conduit 13 is provided upon its outer end with a nozzle 17 through which the vertically moving dust and air may pass, the nozzle providing an outlet 18 which will spread the vertically moving dust and air into a sector shape or fan shape, the plane of which lies in the longitudinal axis of the conduit 13.

As illustrated herein, the conduit 13 is substantially circular in cross section throughout the greater portion of its length, while the outer end 19 of the conduit 13 may be flattened out into a rectangular cross section which portion of the conduit 13 is preferably offset downwardly from the major portion of the conduit in order that the outer end or nozzle end of the conduit 13 may lie at the lowest possible level relative to the ground while the main body of the conduit 13 may be elevated slightly above the ground in order to clear clods or other low obstructions which may be extending above the surface of the ground. The offset end of the conduit is provided with an opening 20 through its upper wall 21 through which the dust and air may pass in a vertical stream into the nozzle 17 and then be spread out in its sector shape.

By referring particularly to Fig. 4 it will be observed that the end of the conduit is provided with a closure plate or baffle 16 against which the air and dust will impinge as it is blown horizontally through the conduit 13, the air so impinging upon the end or baffle 16 to form a substantially dead air cushion which will assist in the directing of the remainder of the blast of air and dust upwardly through the opening 20. In actual practice this blast of air and dust passing upwardly through the opening 20 has considerable velocity and the air cushion so formed assists in preventing the precipitation of the dust in the outer end of the conduit 13.

The nozzle 17 is illustrated as being formed of a suitable housing preferably of metal attached directly to the upper wall 21 of the conduit, the outlet opening of which is in the form of an elongated slot.

By referring particularly to Figs. 3 and 4, it will be observed that a number of small baffle plates 22, 23 and 24 are arranged within the nozzle 17 near the outlet 18 thereof, these baffle plates extending crosswise of the nozzle 17 and being disposed at various angles to the vertical for the purpose of engaging the upwardly directed blast of air and dust and separating the same, directing portions of the blast outwardly to produce the sector-shaped blast hereinbefore described.

With the apparatus thus far described, the carriage 1 may be moved down the aisle between two rows of trees, or along the side of a row of trees at a distance from the trees sufficient to clear the exterior foliage of the tree. As the carriage is moved toward a tree, the operator of the machine may swing the conduit 13 forwardly to the position shown at 13a to direct the nozzle under the low hanging branches of the tree, placing the nozzle as close to the trunk of the tree as is permitted. The conduit may be swung to this position by any suitable means, such as a cable 25. When the nozzle has been so placed beneath the tree the operator may then actuate the valve 6 by means of a suitable handle 26, permitting a regulated quantity of dust to be injected into the blast of air from the blower 4. The dust and air blast will then be transmitted to the nozzle 17 from which it will be ejected in the sector-shaped blast beneath the tree and near the trunk thereof, the spread of the sector-shaped blast being such that portions of the blast will be directed substantially horizontally outwardly at both sides of the tree to insure the application of dust to the lowermost branches, while the remaining portions of the blast will be directed upwardly through the interior of the tree producing a cloud of dust below the tree which will be distributed over the interior of the leaves and over the fruit. Since the dust employed is relatively fine, some small quantities of the dust cloud will be deposited upon the exterior of the leaves, though the major portion of the dust, being ejected with considerable velocity against the underneath side of the leaves, will accumulate thereon, thus insuring that relatively large quantities of the dust will be applied to those portions of the leaves upon which the insects and their larva congregate. As the carriage 1 moves upwardly along the row of trees the nozzle end of the conduit 13 will remain below the tree and the forward movement of the carriage 1 will swing the conduit 13 about the nozzle as a center through the position indicated at 13b, 13c and 13d, thus causing the sector-shaped blast to be rotated below the tree, insuring the application of dust to all parts of the tree, while when the carriage has passed beyond the tree the operator may draw upon the cable 25 and swing the nozzle forwardly to position it beneath the next tree.

The outer end of the nozzle 13 is preferably provided with a shoe 27 formed of suitable heavy metal to withstand dragging over the ground so that when the nozzle has been swung to the desired position beneath the tree the outer end of the conduit will rest with the shoe 27 in contact with the ground, thus making it unnecessary for the operator to manipulate the conduit during the forward movement of the carriage 1.

It will thus be observed that I have provided a dust applicator in which a blast of air and finely divided sulphur or similar insecticide or fungicide is applied in an air blast emanating from beneath the tree and directed in the sector shape so as to direct the dust with considerable force against all portions of the interior of the tree, producing a dust cloud which rises vertically through the foliage of the tree, applying the dust to those portions of the tree where it will do the most good.

It will also be observed that the dust so applied to the interior portion of the tree may be in relatively large quantities since little or no dust will be applied to the exterior of the leaves and to the portions of the fruit which are exposed to the direct rays of the sun. Thus I provide a sufficient coating of dust for the destruction of the insects, I effectively prevent the dust from being applied to the tree in such manner as to permit sulphur-burning, or similar burning, of the tree.

While I have shown and described the preferred embodiment of my invention, I do not wish to be limited to any of the details of construction shown herein, except as defined in the appended claims.

I claim:

1. In a vertical dust applicator comprising a passage member provided with an extension having at its end a rectangularly shaped detachable and adjustable end member, a flared nozzle means positioned upon said end member having a plurality of baffle plates internally positioned, and adjusting screws connected to said baffle plates adapted to adjust and hold in positions said baffle plates within said nozzle means, so that the dust passing therethrough may be directed and deflected upwardly and sidewardly.

2. In a dust applicator of the character described, comprising a chamber, a conduit means connected to said chamber and extending therefrom, a horizontally extending conduit extension means connected to said last mentioned means adapted to revolubly and adjustably hold said horizontally extending conduit means when in use, and a nozzle means connected to the end of the said horizontally extending conduit means, said extended conduit being of rigid construction having resilient supporting means connected thereto so as to compensate the weight of the said extended conduit so that the said nozzle means may be easily adjusted while in horizontal position, and beneath the foliage of the trees and vines.

3. In a dust applicator for dusting or dry spraying trees with insecticide or fungicide dusts, a carriage movable along the ground past trees to be dusted, blower means on said carriage, a conduit mounted on said carriage communicating with said blower for receiving dust and air from said blower, means suspending said conduit from said carriage to extend horizontally therefrom at substantially ground level, and permitting substantially free movement of said conduit in a horizontal direction, whereby the outer end of said conduit may be projected beneath a tree in advance of the movement of said carriage past said tree, and may be maintained beneath said tree while said carriage passes said tree, and nozzle means on the outer end of said conduit for directing the blast of air beneath said tree.

4. In a dust applicator for dusting or dry spraying trees with insecticide or fungicide dusts, a carriage, means on said carriage for producing a blast of air mixed with said dust, an elongated conduit, means pivoting one end of said conduit to said carriage for movement in a horizontal track parallel to the ground and spaced immediately adjacent the level of the ground over which the carriage moves, whereby said conduit may be swung to position its outer end beneath the tree in advance of the approach of the carriage to said tree, and may be maintained beneath said tree during the passage of the carriage past said tree, and nozzle means on said outer end of said conduit for directing the blast of air and dust upwardly through the interior of said tree when said outer end of said conduit is so positioned beneath a tree.

5. In a dust applicator for dusting or dry spraying trees with insecticide or fungicide dusts, a carriage, means on said carriage for producing a blast of air mixed with said dust, an elongated conduit, means pivoting one end of said conduit to said carriage for movement in a horizontal track parallel to the ground and spaced immediately adjacent the level of the ground over which said carriage moves, whereby said conduit may be swung to position its outer end beneath the tree in advance of the approach of the carriage to said tree, and may be maintained beneath said tree during the passage of the carriage past said tree, nozzle means on the outer end of said conduit for directing said blast of air and dust upwardly beneath said tree in the shape of a sector lying in a plane passing through the longitudinal axis of said conduit.

6. In a dust applicator for dusting or dry spraying trees with insecticide or fungicide dusts, a carriage, means on said carriage for producing a blast of air mixed with said dust, an elongated conduit, means pivoting one end of said conduit to said carriage for movement in a horizontal track parallel to the ground and spaced immediately adjacent the level of the ground over which said carriage moves, whereby said conduit may be swung to position it outer end beneath the tree in advance of the approach of the carriage to said tree, and may be maintained beneath said tree during the passage of the carriage past said tree, nozzle means on the outer end of said conduit for directing the blast of air and dust through said conduit upwardly beneath said tree and for spreading said upwardly directed blast of air and dust in a substantial fan shape, the plane of which lies in the longitudinal axis of the conduit.

7. In a dust applicator for dusting or dry spraying trees with insecticide or fungicide dusts, an elongated conduit having a nozzle at one end thereof for directing a blast of air and dust through said conduit vertically from the end of said conduit substantially in the shape of a sector of a circle extending in a plane through the longitudinal axis of said conduit, means for supporting said conduit parallel to the ground substantially at ground level whereby said nozzle may be positioned adjacent said tree beneath extending branches of the tree to apply said dust from the underside of said branches.

JAMES W. FOOTE.